Patented Jan. 14, 1936

2,028,082

UNITED STATES PATENT OFFICE 2,028,082

METHOD OF PREPARING THIAZYL MONOSULPHIDES

Jan Teppema, Cuyahoga Falls, Ohio, assignor to Wingfoot Corporation, Wilmington, Del., a corporation of Delaware No Drawing. Application July 29, 1933, Serial No. 682,886

21 Claims. (Cl. 260—44)

This invention relates to certain compounds of the class of thiazyl mono sulphides. More particularly, it relates both to such thiazyl mono sulphides as new compounds and to the process of preparing them. As herein disclosed, the latter may be carried out simply and efficiently and gives rise to products of a high degree of purity. Among other things, the thiazyl mono sulphides of the present invention find use, when employed with basic organic materials, as accelerators of the vulcanization of rubber.

The thiazyl mono sulphides of this invention may be prepared by reacting a 1-halogen thiazole with an inorganic sulphide, organic hydrosulphide or its corresponding metal sulphhydrate. The type formula of the products is believed to be

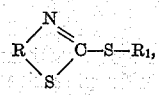

wherein R is a hydrocarbon or substituted hydrocarbon group and $R_1$ is an aliphatic or aromatic organic group. If 1-chlor benzothiazole is employed, R is a phenylene group and if an inorganic sulphide such as sodium, potassium, ammonium or calcium sulphide is used, $R_1$, as will be more fully described hereinafter, is a thiazyl group. When an organic hydrosulphide or metal sulphhydrate thereof is employed, $R_1$ is the corresponding organic group. Thus with thiophenol, $R_1$ is a phenyl group; with sodium ethyl mercaptan, an ethyl group; and with a mercaptobenzothiazole, a benzothiazole group.

Preferably the reaction is carried out in the presence of heat, although this is not in all cases necessary. The materials themselves may be brought together and heated or they may be dissolved in suitable solvents and the solutions brought together and heated, as desired. If the reaction is to be carried out at room temperature, it will generally be found preferable to bring together solutions of the materials rather than the materials themselves. Although it is not strictly necessary, a catalyst such as aluminum chloride or the like may be used to advantage, particularly in cases where a free mercaptothiazole is one of the starting materials.

The process will be illustrated hereinafter by reference to specific compounds, but it is to be understood that the invention is not limited to the compounds so used as examples.

To illustrate one method of preparation, 25 grams of the sodium salt of 1-mercaptobenzothiazole and 17 grams of 1-chlor benzothiazole are heated in a sealed tube for approximately five hours at a temperature of approximately 225–230° C. The reaction mixture is then crystallized several times from hot alcohol, from which is obtained an excellent yield of di(benzothiazyl) mono sulphide having a melting point of 145° C. The probable equation representing the reaction is as follows:

Di(benzothiazyl) mono sulphide so obtained has been found, on analysis, to contain 32.22% sulphur and 9.12% nitrogen, as compared with the theoretical analysis for di(benzothiazyl) mono sulphide of 32.0% sulphur and 9.33% nitrogen.

Another illustration is furnished by heating over a steam bath to approximately 47–50° C. a carbon bisulphide solution of 17 grams of 1-chlor benzothiazole and 19 grams of 1-mercaptobenzothiazole to which 20 grams of aluminum chloride have been added. The heating is continued for one hour, during which time an evolution of hydrogen chloride occurs. The reaction mixture is then allowed to stand for a number of hours, after which it may be distilled on a steam bath. The residue is poured into water, filtered, extracted with ammonium hydroxide and hydrochloric acid and then crystallized from ethyl alcohol. The product, di(benzothiazyl) mono sulphide, is obtained in the form of crystalline needles melting at 98–99° C. Di(benzothiazyl) mono sulphide so prepared has been found to have a sulphur content of 31.78% and a nitrogen content of 9.65%. The equation which is believed to represent the reaction is as follows:

of the class of 1-halogen thiazoles in the practice of this invention. Other available chlor arylene

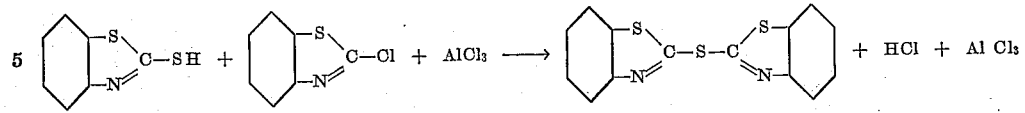

Apparently there are two di(benzothiazyl) sulphides, one melting at 98–99° C. and the other at 145° C., which are either isomeric or isomorphous. The one of lower melting point can be converted into the one of higher melting point by heating to 150° C. or above. Both forms have value in rubber technology as accelerators of vulcanization when employed in conjunction with organic bases.

Similarly, 5-nitro di(benzothiazyl)mono sulphide may be prepared by adding 21.5 grams of 5-nitro 1-chlor benzothiazole to an alcohol solution of sodium mercaptobenzothiazole and heating. The precipitate, after cooling, is filtered, washed successively with alcohol and water, and dried. The product melts at 140–142° C.

Illustrating the employment of an inorganic sulphide in the practice of the invention, 51 grams of molten sodium sulphide (Na₂S.9H₂O) are added to a hot solution of 85.6 grams of 5-nitro 1-chlor benzothiazole in 1250 cc. of butyl alcohol. The mixture is boiled for approximately 15 minutes and cooled, whereupon a yellow solid separates out. After filtering, washing with alcohol and then with water, and drying the product, 5-5′ dinitro di(benzothiazyl) mono sulphide melting at a temperature of 276–278° C. is obtained in a yield of approximately 70 grams. The equation representing the reaction is as follows:

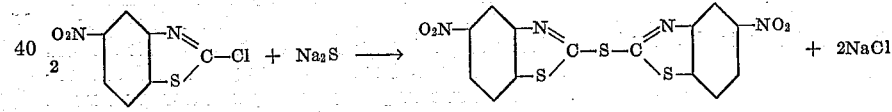

The process may also be carried out at room temperature, although it will generally be found that under such conditions the time required for complete reaction is too long for practical purposes. Thus, if 10 grams of 1-mercaptobenzothiazole are dissolved in 125 cc. of alcohol, 10 grams of 1-chlor benzothiazole are added thereto and the mixture is left standing for three days, a yield of approximately 15 grams of di(benzothiazyl)mono sulphide melting at 95–97° C. is obtained upon purification of the product. In thus effecting the reaction at room temperature, ethylene dichloride may be used as the solvent with substantially the same results as with alcohol.

It is to be understood that these examples are merely illustrative of the process and that many variations may be made therein. Thus the chlor thiazole may be dissolved in ethyl, butyl or other alcohol, a solid alkaline salt of 1-mercaptothiazole added thereto and the mixture refluxed for several hours. The mixture is then poured into water to dissolve the alkaline chloride. On cooling, the dithiazyl mono sulphide crystallizes from the alcoholic layer and may then be purified. Similarly, 1-chlor benzothiazole may be added to an aqueous solution of sodium mercaptobenzothiazole, the mixture heated and the product purified as above.

Because of their relative cheapness and availability, the 1-chlor arylene thiazoles such as 1-chlor benzothiazole and 1-chlor naphthothiazole will generally be preferred to the other members thiazoles are, however, the 1-chlor tolyl thiazoles, the 1-chlor xylyl thiazoles, 1-chlor 5-nitro benzothiazole, 1-chlor 4-chlor 5-nitro benzothiazole, 1, 4 di-chlor benzothiazole, 1, 5 di-chlor benzothiazole, 1-chlor 4-nitro benzothiazole, 1-chlor 5-nitro benzothiazole, 1-chlor 3-phenyl benzothiazole, 1-chlor 3-phenyl thiazole, 1-chlor thiazole, 1-chlor 5-ethoxy benzothiazole and other ring-substituted nitro-, alkoxy-, halogen, alkyl- and aryl-1-chlor arylene thiazoles. The 1-brom and other halogen thiazoles also may be employed with excellent results.

If the sulphide starting material is a mercaptothiazole, either the hydrosulphide or corresponding metal sulphhydrate thereof may be employed. Other examples of the hydrosulphide are 1-mercaptothiazole, 3-butyl mercaptothiazole, 1-mercapto 3-phenyl thiazole, 1-mercapto 3-5-dimethyl benzothiazole, 5-nitro mercaptobenzothiazole, 5-amino mercaptobenzothiazole, 4-chlor mercaptobenzothiazole, 5-chlor mercaptobenzothiazole, 1-mercapto naphthothiazole, 1-mercapto 5-methoxy benzothiazole, 5-methyl mercaptobenzothiazole, 1-mercapto 3-phenyl benzothiazole, the mercapto tolyl thiazoles, and other ring-substituted nitro, amino, halogen, alkyl, alkoxy and aryl mercapto arylene thiazoles. The metal sulphhydrates are, of course, prepared by simply mixing the desired mercaptothiazole in an aqueous solution of the desired alkali, such as for example, 1-mercaptobenzothiazole in potassium hydroxide solution to give the potassium salt of mercaptobenzothiazole. Similarly, any other organic hydrosulphide or corresponding metal sulphhydrate may be employed, examples of the hydrosulphides being ethyl mercaptan, thio phenol, benzyl mercaptan, naphthyl mercaptan, ethylene mercaptan, isopropyl mercaptan, methyl mercaptan, propyl mercaptan, o-, m- or p-thio cresol, etc. Illustrative of the inorganic sulphides which may be employed in the practice of the invention are calcium sulphide, sodium sulphide, zinc sulphide, lead sulphide, ammonium sulphide, potassium, cadmium and lithium sulphides.

It is intended that the patent shall cover, by suitable expression in the appended claims, whatever features of patentable novelty reside in the invention.

What I claim is:

1. A process for preparing di-(benzothiazyl)-mono sulphide which comprises heating 1-chlor benzothiazole with 1-mercaptobenzothiazole.

2. A process of preparing a di(aromatic thiazyl) mono sulphide which comprises reacting a 1-chlor aromatic thiazole with a 1-mercapto aromatic thiazole, the aromatic groups being selected from the benzene and naphthalene series.

3. A process of preparing a di(arylene thiazyl)-mono sulphide which comprises reacting a 1-chlor arylene thiazole with a 1-mercapto arylene thiazole.

4. A process of preparing a di(arylene thiazyl) mono sulphide which comprises reacting a 1-halogen arylene thiazole with a 1-mercapto arylene thiazole.

5. A process of preparing a dithiazyl mono sulphide which comprises reacting a 1-chlor benzothiazole with a mercapto-thiazole.

6. The process of preparing a dithiazyl mono sulphide which comprises reacting a mu-chlor thiazole with a mercaptothiazole.

7. The process of preparing a di(benzothiazyl) mono sulphide which comprises reacting a 1-chlor benzothiazole with a 1-mercapto benzothiazole.

8. The process of preparing a di(benzothiazyl)- mono sulphide which comprises reacting a 1-halogen benzothiazole with a 1-mercapto benzothiazole.

9. The process of preparing a di-(benzothiazyl)- mono sulphide which comprises heating a 1-chlor benzothiazole with an alkaline salt of a 1-mercaptobenzothiazole.

10. The process of preparing a dithiazyl mono sulphide which comprises reacting 1-chlor benzothiazole with a mercapto thiazole.

11. The process of preparing a dithiazyl mono sulphide which comprises heating a mu-halogen thiazole with a mercaptothiazole.

12. A nitro di(benzothiazyl) mono sulphide.

13. Di(benzothiazyl) mono sulphide.

14. A di(benzothiazyl) mono sulphide.

15. A di(arylene thiazyl) mono sulphide.

16. A di(aromatic thiazyl) mono sulphide.

17. A di(aromatic thiazyl) mono sulphide, the aromatic groups being selected from the benzene and naphthalene series.

18. A dithiazyl mono sulphide.

19. The process of preparing a thiazyl mono sulphide which comprises reacting a mu-halogen thiazole with a sulphide selected from the class consisting of the mercaptothiazoles, the thio phenolic compounds, the aliphatic mercaptans, the aralkyl mercaptans and metal salts thereof.

20. The process of preparing a thiazyl mono sulphide which comprises reacting a mu-chlor thiazole with a sulphide selected from the class consisting of the mercaptothiazoles, the thio phenolic compounds, the aliphatic mercaptans, the aralkyl mercaptans and metal salts thereof.

21. The process of preparing a benzothiazyl mono sulphide which comprises reacting a mu-chlor benzothiazole with a sulphide selected from the class consisting of the mercaptothiazoles, the thio phenolic compounds, the aliphatic mercaptans, the aralkyl mercaptans and alkali metal salts thereof.

JAN TEPPEMA.